United States Patent [19]

Kumagai

[11] Patent Number: 4,899,029

[45] Date of Patent: Feb. 6, 1990

[54] ELECTRICAL CONNECTOR HIGH-SPEED WELDING APPARATUS

[75] Inventor: Naoki Kumagai, Machida, Japan

[73] Assignee: AMP Incorporated, Harrisburg, Pa.

[21] Appl. No.: 262,389

[22] Filed: Oct. 25, 1988

[30] Foreign Application Priority Data

Nov. 12, 1987 [JP] Japan .............................. 62-286438

[51] Int. Cl.[4] ......................... B23K 11/16; B23K 9/12

[52] U.S. Cl. ..................................... 219/56.1; 219/80; 219/85.16; 219/87

[58] Field of Search ..................... 219/56.1, 80, 85.16, 219/87

[56] References Cited

U.S. PATENT DOCUMENTS

| | | | |
|---|---|---|---|
| 2,789,202 | 4/1957 | Quinlan | 219/56.1 |
| 3,110,083 | 11/1963 | Stine et al. | |
| 3,393,853 | 7/1968 | Durr et al. | |
| 3,539,762 | 11/1970 | Swengel, Sr. et al. | |
| 3,703,623 | 11/1972 | Swengel, Sr. | |
| 3,896,285 | 7/1975 | Delorme | 219/80 |
| 4,681,382 | 7/1987 | Lockard | |
| 4,687,264 | 8/1987 | Shuey | |
| 4,690,647 | 9/1987 | Hamsher, Jr. et al. | |
| 4,692,121 | 9/1987 | Arbogast, Jr. | |

OTHER PUBLICATIONS

Patent Abstracts of Japan, vol. 7, No. 250, (M-254) [1395], Nov. 8th, 1983; and JP-A-58 135 016 (Matsushita Denki Sangyo K.K.), 11-08-1983.

*Primary Examiner*—George H. Miller, Jr.

[57] ABSTRACT

A high-speed welding apparatus comprises a frame F along which a first conveying mechanism (20) moves a carrier member (11) having mounted thereon a holder (14) holding a connector (100) and a cable (103) to a welding station (30). A feed mechanism (30A) at the welding station (30) engages the carrier member (11) and continiously feeds it at a specified speed along the welding station (30) so that a welding device (33) automatically welds electrical conductors of the cable (103) to respective electrical contacts of the connector (100). A second conveying mechanism (40) then moves the carrier member (11) away from the welding station (30) so that the welded connector and cable can be removed therefrom.

6 Claims, 4 Drawing Sheets

ELECTRICAL CONNECTOR HIGH-SPEED WELDING APPARATUS

FIELD OF THE INVENTION

This invention relates to a high-speed welding apparatus which welds electrical conductors of a cable to electrical contacts of an electrical connector.

BACKGROUND OF THE INVENTION

Electrical connectors have been traditionally used to connect or disconnect electrical circuits or other electrical devices. Of these connectors, a large number of electrical contacts are secured in a housing so that a large number of electrical signals can be transmitted therethrough. A cable which carries electrical signals along electrical conductors thereof is connected to the connector with the conductors connected to the contacts.

FIG. 6 shows an example of one of these types of connectors which is disclosed in Japanese Patent Publication No. 62-286438. Multiple electrical receptacle contacts 102 are secured in dielectric housing 101 of connector 100. Contacts 102 electrically engage connecting pins (not shown) which have been inserted through openings 101*a* in housing 101. Contacts 102 are welded to cable conductors 103*a* of cables 103 at the terminating sections 102*a* of contacts 102. In addition, cable conductors 103*b* of cables 103 are welded to ground plate 104.

In order to connect connector 100 to cables 103, terminating sections 102*a* of contacts 102 of connector 100 and the cable conductors, whose ends are exposed, were clamped together in a holder so that they overlapped and were welded with a welding machine while the holder was manually moved along a welding position.

When manual movement of the holder is used to carry out welding as described above, the following problems arise. Not only is the welding time-consuming, but the positioning of the connector and cable within the welding machine at which the welding operations take place becomes easily misaligned which makes for unsatisfactory welding.

It was with these problems in mind that the objective of the present invention resulted in a high-speed welding apparatus which (1) eliminates unsatisfactory welding by combining welding with high-speed automatic holder operation so that the precision of clamping the connector and the cable in the holder would be upgraded; (2) reduces the time required for each of the connectors to be welded to the cable and reduces the time between completion of the welding of one connector to the cable and the beginning of the welding of the next connector to its cable by making it possible to feed multiple holders at continuous consecutive welding positions; and (3) improves overall welding efficiency.

SUMMARY OF THE PRESENT INVENTION

The high-speed welding apparatus of this invention significantly reduces inefficient welding during the high-speed welding of cable conductors to electrical contacts of an electrical connector at a higher speed than the manually-operated welding apparatus that was heretofore used. The procedure for carrying out the operations of high-speed welding apparatus of the present invention is according to the following: a holder having an electrical connector and electrical cable secured thereto with electrical conductors of the cable overlapping respective terminating sections of electrical contacts of the connector is mounted onto a carrier member forming an assembly that is positioned in a loading station of the welding apparatus. A first conveying mechanism conveys the assembly to a welding station at which a feed mechanism engages the carrier member and positions the overlapping conductors and terminating sections relative to a welding device so that the welding device automatically consecutively welds the conductors to the terminating sections whereafter a second conveying mechanism conveys the assembly away from the welding station.

An important feature of the present invention is the use of multiple connector and cable holder and carrier member assemblies in the welding apparatus so that while one of the assemblies is in the welding station, other assemblies are positioned along the first conveying mechanism for movement into the welding station. This reduces the time between completion of the welding of one connector and the commencing of the welding of the next connector.

BRIEF DESCRIPTION OF THE DRAWINGS

The invention, together with the objects and advantages thereof, is best understood by way of example with reference to the following detailed description in conjunction with the accompanying drawings.

DETAILED DESCRIPTION OF THE INVENTION

Figure 1:
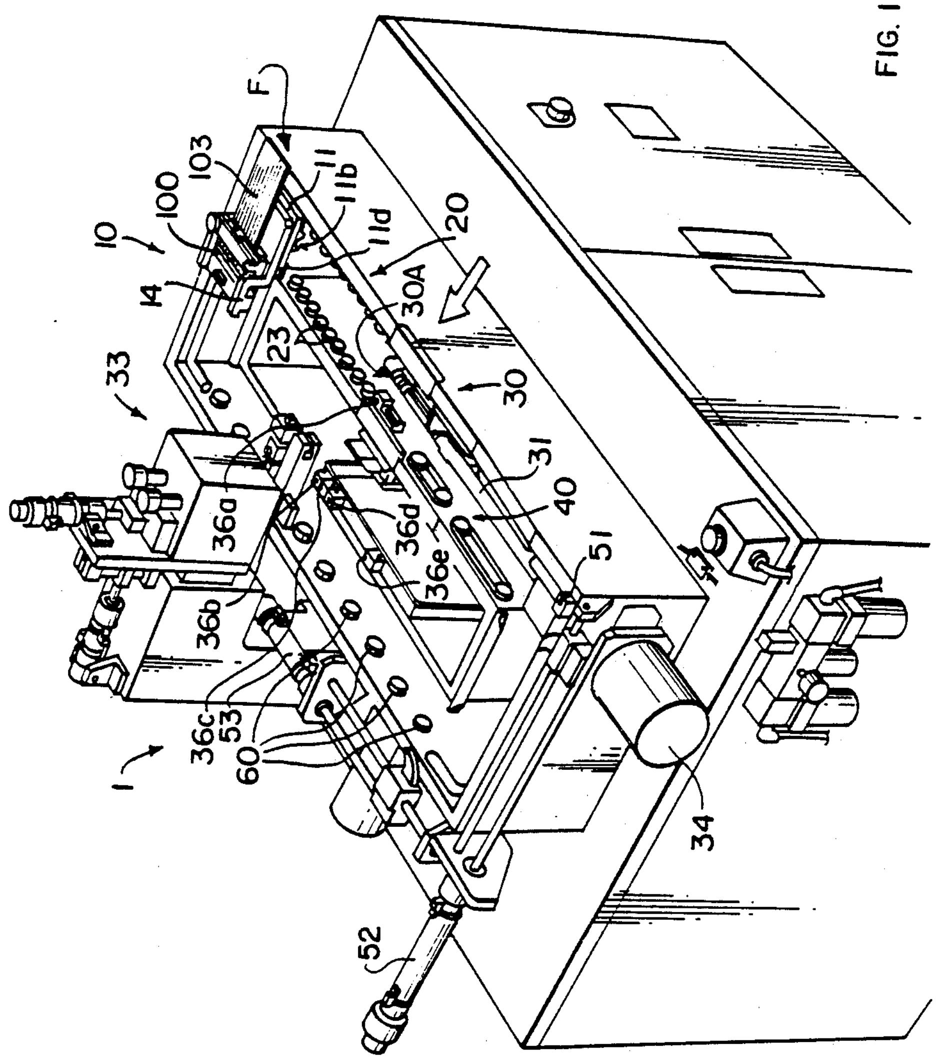
FIG. 1 is a perspective view of a high-speed welding apparatus for automatically welding electrical conductors of an electrical cable to respective terminating sections of an electrical connector.
Figure 6:
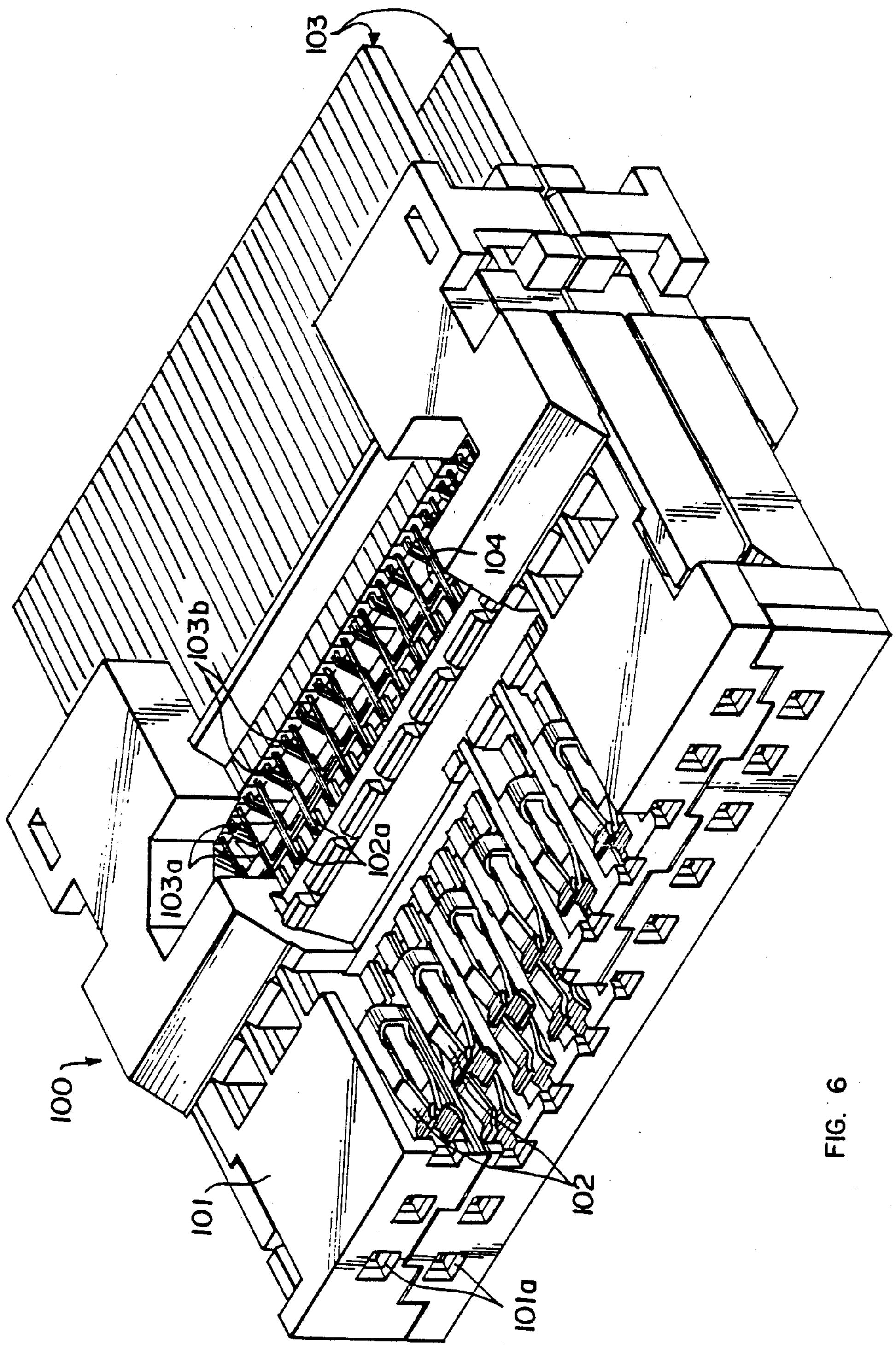
FIG. 6 is a perspective view of the cable and connector with the conductors welded to the contact terminating sections.

A high-speed welding apparatus 1 is shown in FIG. 1 for welding electrical conductors of an electrical cable 103 to electrical contacts of an electrical connector 100 of the type shown in FIG. 6. Apparatus 1 includes a holder 14 for the cable and connector which is mounted on a carrier member 11 that is supported in a loading station 10 of frame F, a first conveying mechanism, a feed mechanism 30, a welding station 30, a second conveying mechanism 40 and a welding mechanism 33.

Figure 3:
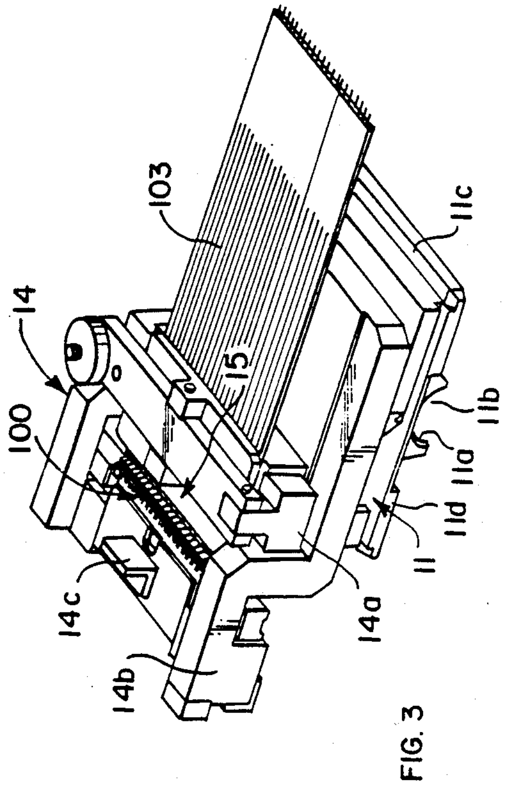
FIG. 3 is a perspective view showing an assembly of an electrical connector and cable in a holder mounted on a carrier member.

As shown in FIG. 3, holder 14 is divided into a cable holder 14*a* which holds electrical cable 103 and connector holder 14*b* which holds electrical connector 100. Cable holder 14*a* clamps and holds the front end of cable 103 which has been stripped to expose the electrical conductors thereof. Cable holder 14*a* with cable 103 clamped thereto is mounted onto connector holder 14*b*. Connector 100 in connector holder 14*b* is moved rearwardly by member 14*c*, which is movably mounted on holder 14*b*, until conductors 103*a*, 103*b* are in overlapping engagement with terminating sections 102*a*, 104 of electrical contacts 102 of connector 100, as shown in FIG. 6. Connector and cable are held so that welding operations can take place from outside of holder 14 because the parts to be welded are exposed while being held in holder 14 as will be explained hereafter. Holder 14, which now holds connector 100 and cable 103, is mounted onto carrier member 11 which is supported at the loading station 10 of welding apparatus 1.

Figure 5:
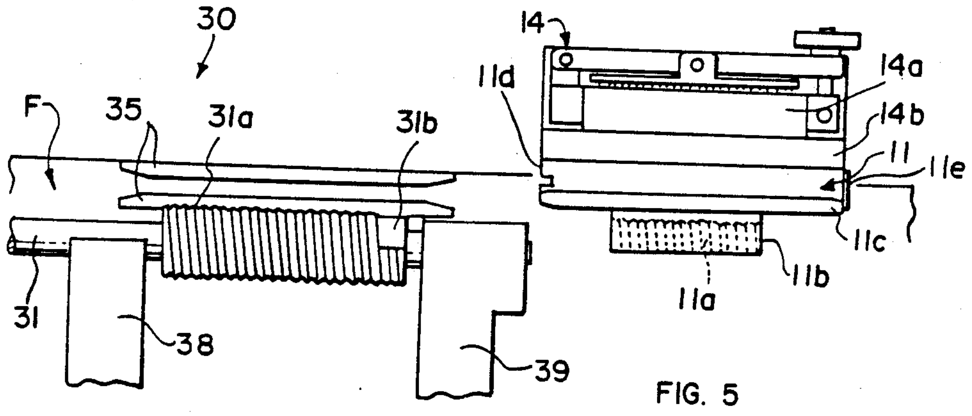
FIG. 5 is a part view of FIG. 2 showing details of the feed mechanism, the holder and the carrier member.

Carrier member 11, as shown in FIG. 5, has a semicircular groove 11*b* with threads 11*a* which extend in the direction of movement of carrier member 11 so that each of the corresponding electrical contacts and cable conductors can be welded in regular sequence while holder 14 with connector and cable clamped thereto is being carried on carrier member 11 during the welding operations. In addition, rails 11*c* on each side of carrier member 11 move along guides 35 on frame F (which shall be described hereafter) in order to more accurately position carrier member 11 and therefore the overlapping conductors and terminating sections during the welding operations.

Positioning cable holder 14*a* and connector holder 14*b* on the one hand and connector holder 14*b* and carrier member 11 on the other is accomplished by a pin (not shown) on the former and inserting it into an opening (not shown) in the latter.

When holder 14 holding connector 100 and cable 103 is mounted onto carrier member 11, which is located at loading station 10, carrier member 11 is moved in the direction of welding station 30 by an operator. Thus, carrier member 11 is conveyed in the direction of welding station 30 by the first conveying mechanism 20. First conveying mechanism 20 is configured so that when roller 21, which is connected to the shaft of the motor (not shown), rotates, endless belts 22 in engagement with opposing rollers 23 on frame F are driven thereby causing rollers 23 to rotate and carrier member 11 is carried by the rotation of rollers 23 in engagement with rails 11*c*.

Figure 4:
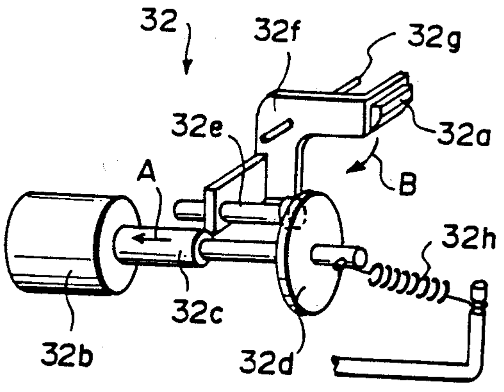
FIG. 4 is a perspective view showing elements of the feed mechanism for feeding the assembly of FIG. 3 in the welding station.

FIG. 4 shows a carrier stop mechanism 32 located at welding station 30. When carrier member 11 is moved to welding station 30, the front end 11*d* of carrier member 11 engages stop member 32*a* and carrier member 11 cannot proceed any further. When solenoid 32*b* is operated, armature 32*c* of solenoid 32*b* moves in the direction indicated by the arrow A and disc 32*d* on armature 32*c* is moved toward solenoid 32*b* against the spring force of spring 32*h* connected between the end of armature 32*c* and frame F. When disc 32*d* is moved by solenoid 32*b*, pusher member 32*e* as part of lever 32*f* is engaged by disc 32*d* causing lever 32*f* to pivot on shaft 32*g* in the direction of arrow B. This enables stop member 32*a* to move free of the front end 11*d* of carrier member 11 so that carrier member 11 is again able to move by the first conveying mechanism 20 in the left-hand direction when viewing FIG. 2. When welding operations for the connector 100 and cable 103 on carrier member 11 have been completed, solenoid 32*b* is de-energized and armature 32*c* is moved to its original position by spring 32*h* which enables pusher member 32*e* to follow disc 32*d* and lever 32*f* to return to its original position so that stop member 32*a* prevents a following carrier member from going any further until later.

Figure 2:
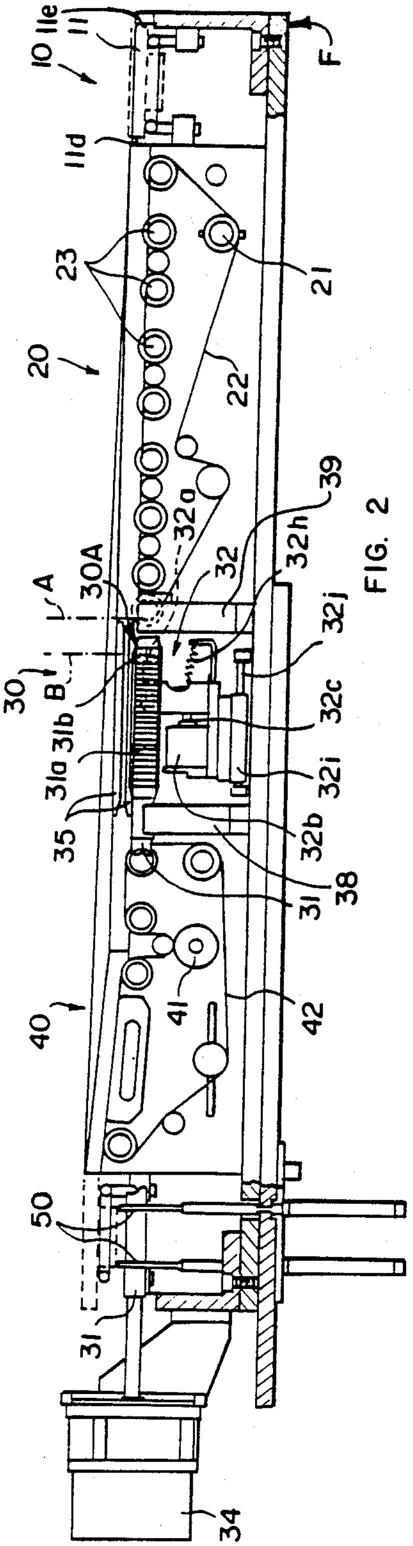
FIG. 2 is a cross-sectional view of the apparatus of FIG. 1 showing the conveying mechanisms on either side of the feed mechanism.

Solenoid 32*i* on frame F, as shown in FIG. 2, has an armature 32*j* connected to stop mechanism 32. Solenoid 32*i* is periodically operated causing armature 32*j* to be subjected to reciprocating movement thereby moving stop mechanism 32 and carrier member 11 forward as explained in greater detail hereafter.

FIG. 5 shows the feed mechanism 30A located at the welding station 30 for feeding carrier member 11 along the welding station so that the electrical conductors of cable 103 can be welded to the contacts in the connector 100 located in holder 14 mounted on carrier member 11.

Shaft 31 has one end rotatably mounted in spaced supports 38, 39 while the other end is coupled to motor 34 which rotates it. Threads 31*a* are located on shaft 31 between supports 38, 39 which are threadably engagable with threads 11*a* in groove 11*b* of carrier member 11 in order to move carrier member 11 along the welding station. A front half section 31*b* of threads 31*a* is eliminated which ensures that threads 11*a* and 31*a* smoothly and accurately engage one another. Rails 11*c* of carrier member 1 move along guides 35 on opposing sections of frame F which also accurately positions carrier member 11 during the welding operations.

Operation of high-speed welding apparatus 1 is according to the following description.

Connector 100 and cable 103 are placed in holder 14 with electrical conductors of the cable in overlapping position with respective terminating sections of the electrical contacts. Holder 14 is mounted onto carrier member 11 in loading station 10 of welding apparatus 1 and carrier member 11 is moved along frame F until first conveying mechanism 20 conveys carrier member 11 to welding station 30.

When the front end 11*d* of carrier member 11 reaches position A of FIG. 2, it engages stop member 32*a* of stop mechanism 32 which stops carrier member 11. Sensing device 36*a*, FIG. 1, at position A detects the presence of carrier member 11 and causes solenoid 32*i* to operate which moves stop mechanism 32 until stop member 32*a* and therefore the first end 11*d* of carrier member 11 are at position B, FIG. 2, because conveying mechanism 20 is in engagement with carrier member 11.

At position B, the front end 11*d* of carrier member 11 engages sensing device 36*b*, FIG. 1, causing it to operate solenoid 32*b* and motor 34 and threads 11*a* of carrier member 11 engage threads 31*a* of shaft 31. Stop member 32*a* is moved free of the front end 11*d* of carrier member 11 and the threadable engagement of threads 11*a*, 31*a* under the influence of motor 34 now operating at a high speed moves carrier member 11 along guides 35 until sensing device 36*c* is engaged by front end 11*d* of carrier member 11 which causes motor 34 to operate at a slower speed thereby moving carrier member 11 at a lower speed.

When the front end 11*d* of carrier member 11 engages sensing device 36*d*, FIG. 1, welding device 33 is operated which welds signal conductors 103*a* to terminating sections 102*a* and ground conductors 103*b* to ground plate 104, FIG. 6, as carrier member 11 moves slowly relative to the welding device 33.

After carrier member 11 clears sensing device 36*a*, stop mechanism 32 returns to its original position via solenoid 32*i* and armature 32*j* and solenoid 32*b* is de-energized causing spring 32*h* to move armature 32*c* to its original position and stop member 32*a* to return to position A. This will stop the next carrier member from moving into welding station 30 until the welding operation is to take place.

When the front end 11*d* of carrier member 11 engages sensing device 36*e*, the welding device 33 ceases to operate and motor 34 is operated at a higher speed thereby moving carrier member 11 at a faster speed onto the second conveying mechanism 40, which conveys the carrier member 11 to the end of frame F with sensing device 51 being engaged thereby. At this point, holder 14 is raised from carrier member 11 by pins 50 so that the holder 14 can be removed from carrier member 11. Connector 100 with cable 103 welded thereto can be removed from holder 14 with holder 14 being reused on an empty carrier member at station 10 in conjunction with another connector and cable therein so as to undergo the welding operation as described above.

Second conveying mechanism 40, as shown in FIG. 2, includes endless belts 42 mounted on opposing walls of frame F which are driven by a roller 41 operated by a motor (not shown). Endless belts 42 engage carrier member 11 and move it to the end of frame F.

After holder 14 has been removed from carrier member 11, sensing device 51 causes air cylinders 52, 53 to operate which moves empty carrier member 11 to the back of frame F and then along opposed rollers 60 so that the carrier member is returned to station 10 for reuse.

Several carrier members 11 with holders 14 mounted thereon in which connectors 100 and cables 103 are held can be consecutively moved via the first conveying mechanism, the feeding mechanism and the second conveying mechanism to automatically weld the conductors of the cables to the contacts of the connectors in the welding station in a continuous manner and at high rate of speed.

The sensing devices 36 *a–e* and 51 can be microswitches or any suitable device.

I claim:

1. A high-speed welding apparatus for welding electrical conductors of an electrical cable (103) to electrical contacts of an electrical connector (100) comprising a holder (14) for holding the connector and cable, a carrier member (11) onto which the holder (14) is mounted, a frame (F) for supporting the carrier member (11) and along which the carrier member moves, a welding device (33) for welding the conductors to the contacts as the connector and cable move relative thereto along a welding station (30), characterized in that a first conveying mechanism (20) on said frame (F) moves the carrier member (11) to the welding station (30); a feed mechanism (30A) on said frame (F) engaging said carrier member (11) to continuously feed the carrier member with the connector (100) and cable (103) thereon along the welding station while the welding device (33) automatically welds the conductors of the cable (103) to the contacts of the connector (100); and a second conveying mechanism (40) mounted on the frame (F) for moving the carrier member away from the welding station after the cable conductors have been welded to the connector contacts.

2. A high-speed welding apparatus as claimed in claim 1, characterized in that a stop mechanism (32) is located on said frame (F) for stopping the carrier member (11) at the entrance to the welding station (30) to assure that the feed mechanism (30A) properly engages with the carrier member (11).

3. A high-speed welding apparatus as claimed in claim 1, characterized in that guides (35) are located on said frame (F) along said welding station (30) for engagement by the carrier member (11) to guide the carrier member (11) along the welding station (30).

4. A high-speed welding apparatus as claimed in claim 1, characterized in that the stop mechanism (32) includes a moving mechanism (32*i*, 32*j*) for moving the stop mechanism (32) from a stop position (A) at the front end of the welding station to a second position (B) enabling the feed mechanism (30A) and the carrier member to interengage one another.

5. A high-speed welding apparatus as claimed in claim 4, characterized in that the stop mechanism (32) includes a stop member (32*a*) as part of a lever (32*f*) pivotally mounted on a shaft (32*g*), the lever (32*f*) being pivotally moved by a spring-biased armature (32*c*) operatively engagable with the lever (32*f*) so that when the armature (32*c*) is operated by an operating means (32*b*), lever (32*f*) pivots about shaft (32*g*) moving stop member (32*a*) free of the carrier member (11) enabling the feed mechanism (30A) in engagement with the carrier member (11) to feed the carrier member (11) along the welding station (30).

6. A high-speed welding apparatus as claimed in claim 5, characterized in that the feed mechanism (30A) comprises a threaded section (31*a*) of a rotatable shaft (31) threadably engagable with a threaded section (11*a*) of the carrier member (11).

* * * * *